United States Patent
Amirthasamy et al.

(10) Patent No.: US 10,198,285 B2
(45) Date of Patent: *Feb. 5, 2019

(54) SYSTEM AND METHOD FOR CREATING VIRTUAL DISK IMAGES FOR USE WITH REMOTE COMPUTER

(71) Applicant: AVOCENT HUNTSVILLE, LLC, Huntsville, AL (US)

(72) Inventors: Joseph Amirthasamy, Plantation, FL (US); Craig S. Siegman, Pembroke Pines, FL (US)

(73) Assignee: VERTIV IT SYSTEMS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/730,198

(22) Filed: Oct. 11, 2017

(65) Prior Publication Data

US 2018/0032365 A1 Feb. 1, 2018

Related U.S. Application Data

(63) Continuation-in-part of application No. 14/433,525, filed as application No. PCT/US2013/063056 on Oct. 2, 2013, now Pat. No. 9,841,984.

(Continued)

(51) Int. Cl.
*G06F 9/455* (2018.01)
*H04L 29/06* (2006.01)
(Continued)

(52) U.S. Cl.
CPC ......... *G06F 9/45558* (2013.01); *G06F 9/452* (2018.02); *G06F 9/45529* (2013.01);
(Continued)

(58) Field of Classification Search
CPC .... G06F 3/0619; G06F 3/0664; G06F 3/0665; G06F 17/30902; G06F 9/45558;
(Continued)

(56) References Cited

U.S. PATENT DOCUMENTS 7,900,005 B2 * 3/2011 Kotsovinos ........... G06F 9/5083
711/162
9,513,823 B2 * 12/2016 Nazari ................. G06F 3/0617
(Continued)

FOREIGN PATENT DOCUMENTS

CN 101420360 A 4/2009
JP 2011-0513816 A 4/2011

OTHER PUBLICATIONS

Chen, Eric Y. et al. "App isolation", Computer and Communications Security, ACM, 2 Penn Plaza, Suite 701, New York, NY 10121-0701 USA, Oct. 17, 2011, pp. 227-238, XP058006054, DOI: 10.1145/2046707.2046734, ISBN: 978-1-4503-0948-6, p. 228, line 21-p. 229, line 44.

(Continued)

*Primary Examiner* — Joseph E Avellino
*Assistant Examiner* — Binod J Kunwar
(74) *Attorney, Agent, or Firm* — Harness, Dickey & Pierce, P.L.C.

(57) ABSTRACT

A system and method is disclosed for creating and exposing virtual disk images to a host server, during a KVM session, using an HTML5 KVM/virtual media client running in a Chrome™ Web browser of a user's device (e.g., PC workstation). The host server is able to select all or specific portions of the virtual disk image for use, whereupon the bytes representing the selected data content are packaged by the HTML5 KVM/virtual media client using a persistent sandbox and transmitted to the host server. Using the HTML5 KVM/virtual media client to create and expose (Continued)

virtual disk images from the persistent sandbox of the Chrome™ Web Browser eliminates the problem of the Web browser not being able to directly access physical media (e.g., disks) on the user's device, and further significantly reduces data size limitations on the size of the virtual disk images that may be created.

22 Claims, 5 Drawing Sheets

Related U.S. Application Data (60) Provisional application No. 61/709,468, filed on Oct. 4, 2012.

(51) Int. Cl.
    *G06F 9/451*    (2018.01)
    *H04L 29/08*    (2006.01)

(52) U.S. Cl.
    CPC .............. *H04L 67/04* (2013.01); *H04L 67/06* (2013.01); *H04L 67/08* (2013.01); *H04L 67/1097* (2013.01); *H04L 67/38* (2013.01); *G06F 2009/45579* (2013.01); *G06F 2009/45583* (2013.01); *G06F 2009/45595* (2013.01)

(58) Field of Classification Search
    CPC . G06F 2009/45583; G06F 2009/45595; H04L 67/02; H04L 67/08; H04L 67/1097; H04L 67/04; H04L 67/06; H04L 67/38
    USPC ........................................................ 709/202
    See application file for complete search history.

(56) References Cited

U.S. PATENT DOCUMENTS

| | | |
|---|---|---|
| 2004/0225837 A1 | 11/2004 | Lewis |
| 2004/0236821 A1 | 11/2004 | Metzger et al. |
| 2007/0174526 A1 | 7/2007 | Blackwell et al. |
| 2009/0216975 A1* | 8/2009 | Halperin ............. G06F 9/45537 711/162 |
| 2009/0260074 A1* | 10/2009 | De Spiegeleer .. H04L 29/08846 726/15 |
| 2010/0050170 A1* | 2/2010 | Parikh ................. G06F 9/45537 718/1 |
| 2011/0016466 A1* | 1/2011 | Liu .................... G06F 17/30067 718/1 |
| 2011/0055377 A1* | 3/2011 | Dehaan ................. G06F 9/4856 709/224 |
| 2011/0161482 A1* | 6/2011 | Bonola ................. G06F 9/5077 709/223 |
| 2011/0302277 A1* | 12/2011 | Baker ............... G06F 17/30575 709/219 |
| 2013/0132950 A1* | 5/2013 | McLeod ................... G06F 8/63 718/1 |
| 2013/0215884 A1* | 8/2013 | Lo ........................... G06F 3/023 370/359 |
| 2013/0219060 A1* | 8/2013 | Sturgeon ................. G06F 1/206 709/224 |
| 2014/0007254 A1 | 1/2014 | Bukurak et al. |
| 2015/0254089 A1 | 9/2015 | Siegman et al. |
| 2015/0295994 A1 | 10/2015 | Siegman et al. |
| 2017/0302425 A1* | 10/2017 | Slapp, III ................ G09B 7/00 |

OTHER PUBLICATIONS

International Seach Report and Written Opinion for PCT/2018/039262, dated Oct. 26, 2018 ISA/KR.

* cited by examiner

SYSTEM AND METHOD FOR CREATING VIRTUAL DISK IMAGES FOR USE WITH REMOTE COMPUTER

CROSS-REFERENCE TO RELATED APPLICATIONS

This application is a continuation-in-part application of U.S. Ser. No. 14/433,525, filed Apr. 3, 2015, and presently allowed, which in turn claims priority to U.S. Provisional Application No. 61/709,468, filed Oct. 4, 2012. The entire disclosures of the above applications are incorporated herein by reference.

FIELD

The present disclosure relates to systems and methods for creating virtual disk images, and more particularly a system and method for creating virtual disk images of selected data using a web browser of a user's computer, that can be used by a remotely located host server, during a KVM session, just as if a physical device with the selected data had been directly connected to the host server, and without the limitations on storage size imposed when using a temporary sandbox area of the web browser.

BACKGROUND

The statements in this section merely provide background information related to the present disclosure and may not constitute prior art.

Present day keyboard, video and mouse (KVM) appliances and baseboard management controllers (BMCs) allow a user to access remote servers and other devices by passing the keyboard, video and mouse signals between the user's device (typically a laptop, PC, tablet, smartphone, etc.) and the KVM appliance or BMC. For the purpose of discussion, the following examples will make reference only to a KVM appliance, but it will be appreciated that they are equally applicable to communication with a BMC. The keyboard and mouse signals received by the KVM appliance are typically received in some network protocol, for example Ethernet protocol packets, and then converted to a format (e.g., USB) that the remote device can accept.

With the recent development of the HTML5 technology, an HTML5 KVM/virtual media client is now able to run in the Web browser of a user's device when a KVM session is established by the user. Currently HTML5 is supported by several web browsers including Apple Corporation's IOS SAFARI® Web browser, Mozilla's FIREFOX® Web browser, the Google CHROME® Web browsers, the INTERNET EXPLORER® (versions 10 and 11) Web Browser from Microsoft Corp., as well as Microsoft's EDGE®, the OPERA® and OPERA MINI® Web browsers developed by Opera Software. The ability to run the HTML5 KVM/virtual media client in the user's Web browser is a significant advantage because the user typically is highly familiar with using a Web browser. As such, this implementation provides the user with a comfortable, easy to use means for conducting a KVM session with a remote KVM device (e.g., KVM appliance or BMC).

The running of an HTML5 KVM/virtual media client in the user's Web browser does, however, present some significant limitations. For one, the Web browser does not allow the KVM/virtual media client access to the physical disks of the client device on which the Web browser is running (e.g., PC workstation, laptop, computing tablet, smartphone, etc.). This limitation did not exist with a KVM/virtual media client that did not run in the user's Web browser. The technology previously used, such as Java or ActiveX, allowed access to the physical media devices such as disk drives, and thus a disk image was not required to access the data files on the user device. When using a Web browser, however, the Web browser provides a relatively small, temporary storage area termed a "sandbox". The JavaScript engine that runs in the Web browser can bring files into the sandbox. But the JavaScript engine still is not allowed to write out the files, nor is it allowed direct access to the physical media devices on the user's device, such as disk drives, typically used in virtual media implementations. Furthermore, the temporary sandbox is quite small in size, and is typically limited to about 5 MB of temporary storage. This presents a significant limitation to creating disk images, which often exceed the capacity of the sandbox by a substantial amount. As such, using the temporary sandbox of a typical Web browser is only possible when creating small disk image files.

One Web browser presently used by many individuals is the freeware "CHROME™" Web browser available from Google, Inc. of Mountain View, Calif. The CHROME™ Web browser, like other browsers, provides both a temporary sandbox and a persistent sandbox. The persistent sandbox provides significantly more storage area (uses local system's hard drive disk free space) than the temporary sandbox of most other web browsers. Furthermore, with the CHROME™ Web browser it is possible to write out files directly into the persistent sandbox of the CHROME™ Web browser.

As a result, a new system and method is needed for accessing the data files stored on the user's device or physically connected to the user's device, when using an HTML5 KVM/vMedia client running in the Web browser of the user's device, and without the limitations on storage capacity inherent with most Web browsers.

SUMMARY

In one aspect the present disclosure relates to a method for creating and exposing virtual disk images to a host server, during a KVM session, using an HTML5 KVM/virtual media client running in the Web browser of a user's device, where the Web browser includes a temporary sandbox and a persistent sandbox for data storage. The method may comprise sending a selection to the host server of a specific vMedia device to be mapped on the host server. The HTML5 KVM/virtual media client may be used to package selected content using a selected format to create a disk image of the selected content in the persistent sandbox of the Web browser. The host server may be notified of an available virtual disk image and that the virtual disk image has been exposed in the persistent sandbox for use by the host server. The host server may be used to obtain the virtual disk image from the persistent sandbox and then to send a request to the HTML5 KVM/virtual media client for a portion of the data of the virtual disk image to retrieve. The HTML5 KVM/virtual media client may be used to translate the request into at least one specific file that makes up the virtual disk image, and to send bytes of data corresponding to the at least one specific file to the host server. The host server may receive the bytes of data corresponding to the at least one specific file.

In still another aspect the present disclosure relates to a system for creating and exposing virtual disk images to a host server during a KVM session, while using an HTML5

KVM/virtual media client running in a Web browser of a user's device, and where the Web browser includes a temporary sandbox and a persistent sandbox. The system may comprise a user device having the Web browser running thereon. An HTML5 KVM/virtual media client may be included which runs in the Web browser. The HTML5 KVM/virtual client may be configured to perform a plurality of operations including: packaging selected content using a selected format to create a disk image of the selected content in the persistent sandbox of the Web browser; notifying the host server of an available virtual disk image and exposing the virtual disk image within the persistent sandbox for use by the host server; responding to a request from the host server for data corresponding to a portion of the virtual disk image; and using the HTML5 KVM/virtual media client to implement a reverse lookup operation to translate the request for data into at least a portion of at least one specific file that makes up the virtual disk image. The HTML5 KVM/virtual media client may then send bytes of data corresponding to the one specific file to the host server for use.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application or uses. It should be understood that throughout the drawings, corresponding reference numerals indicate like or corresponding parts and features.

Figure 1:
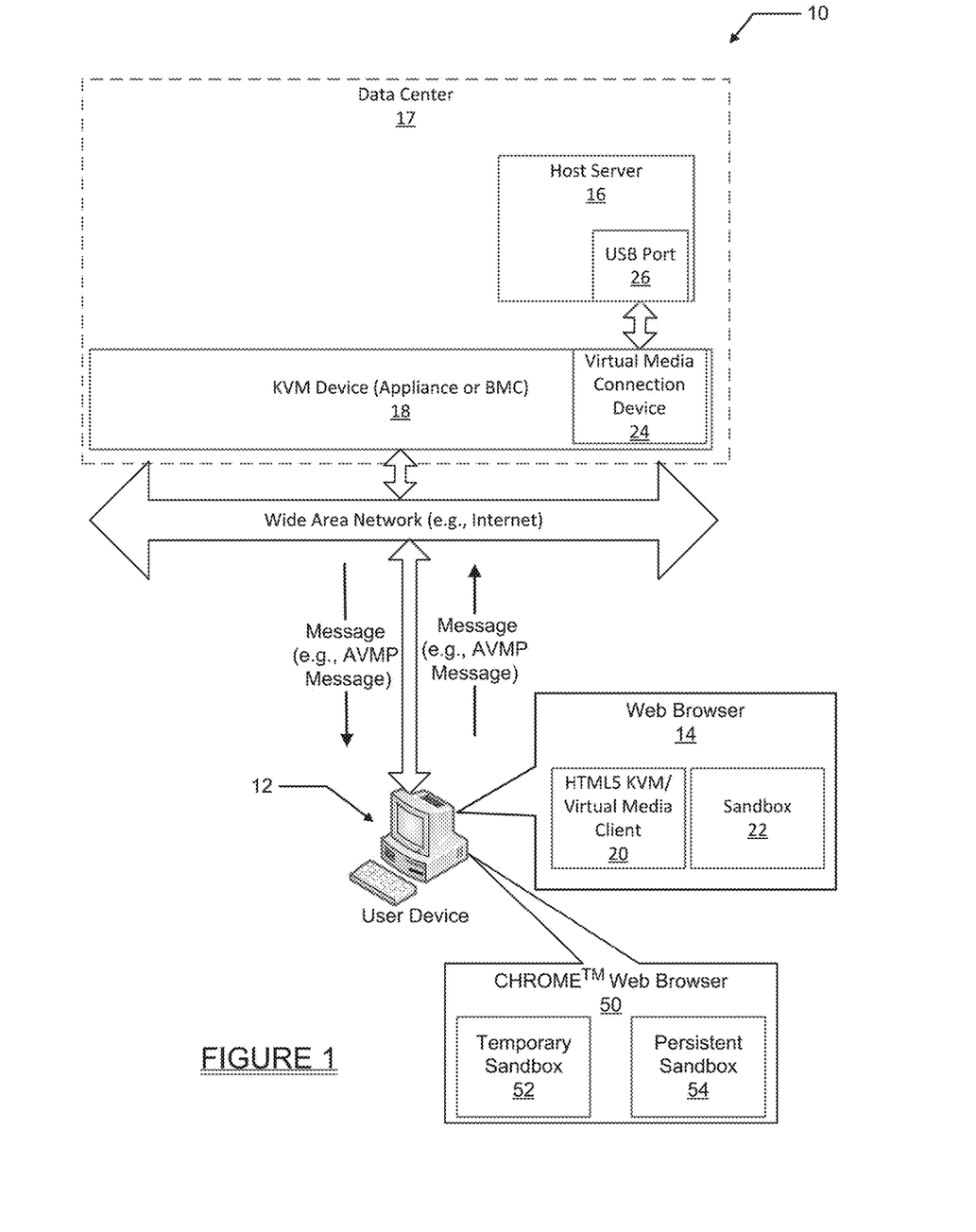
FIG. 1 is a high level block diagram of a system in accordance with an example of the present disclosure for creating virtual disk images of content on the user's device, that may be used by a remote host server during a KVM session when an HTML5 KVM/virtual media client is running in the Web browser of the user's device.

Referring to FIG. 1, a system 10 is shown in which a user device, in this example a workstation computer 12 having a Web browser 14 running thereon, is used to conduct a KVM session with a remotely located Host server 16 at a Data Center 17. A KVM device, in this example a KVM appliance 18, connects the user workstation 12 with the Host server 16. However, it will be appreciated that a BMC could just as readily be implemented in place of a KVM appliance. For the purpose of discussion, however, reference will be made to the KVM device as being a KVM appliance.

The Web browser 14 may have an HTML5 KVM/virtual media client 20 running in it. The Web browser 14 also provides a "sandbox" 22, which is dedicated memory space into which a JavaScript engine running in the Web browser 14 can bring files or portions of files. However, as noted above, the JavaScript engine is not able to write the files out, nor is it permitted direct access to any of the physical devices (disk drive, flash drive) that are contained within the workstation 12 or physically connected to the workstation.

The HTML5 KVM/virtual media client 20 communicates with the Host server 16 via the KVM appliance 18, a virtual media connection device 24 inside the KVM appliance 18, a USB port 26 of the Host server 16, and a wide area network connection (e.g., the Internet). Messages, for example and without limitation AVMP (Avocent Virtual Messaging Protocol) messages, are communicated between the HTML5 KVM/virtual media client 20 and the Host server 16 when virtual disk images are created on the workstation 12 and exposed to the Host server 16, and when status updates (e.g., number of bytes transferred) are sent from the HTML5 KVM/virtual media client to the Host server 16. Creating virtual disk images of files and/or directories on the disk drives of the workstation 12, and exposing the virtual disk images to the Host server 16, provides a means for allowing the Host server 16 to access the contents on any of the disks of the workstation 12, as well as any virtual media device (e.g., flash drive, portable memory device, etc.) that may be physically connected to the workstation 12.

Figure 2A:
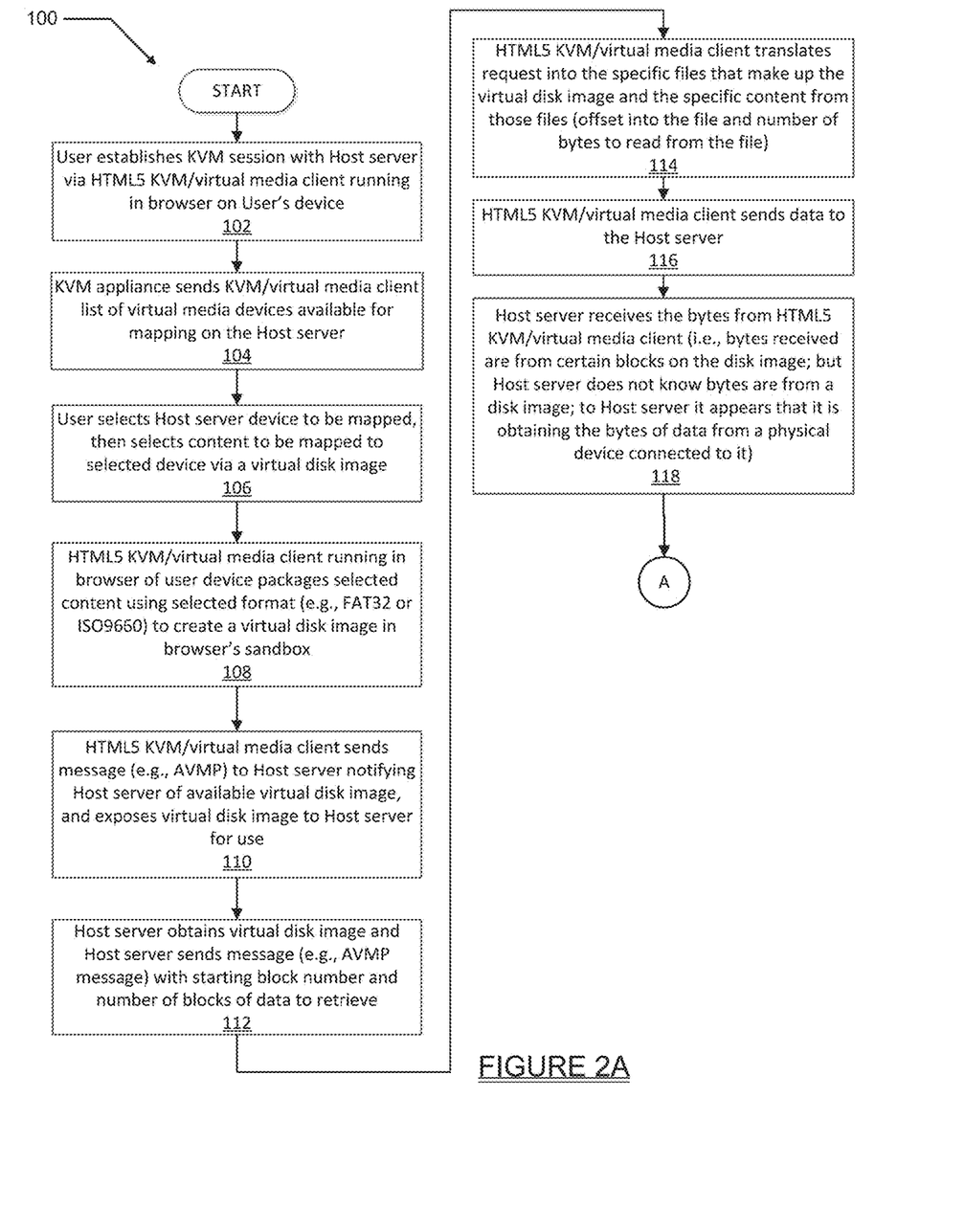
FIGS. 2A and 2B represent a flowchart illustrating one example of a sequence of communications between an HTML5 KVM/virtual media client and a remote Host server by which a virtual disk image is created for use by the Host server, and the contents of the virtual disk image is supplied to the Host server.
Figure 2B:
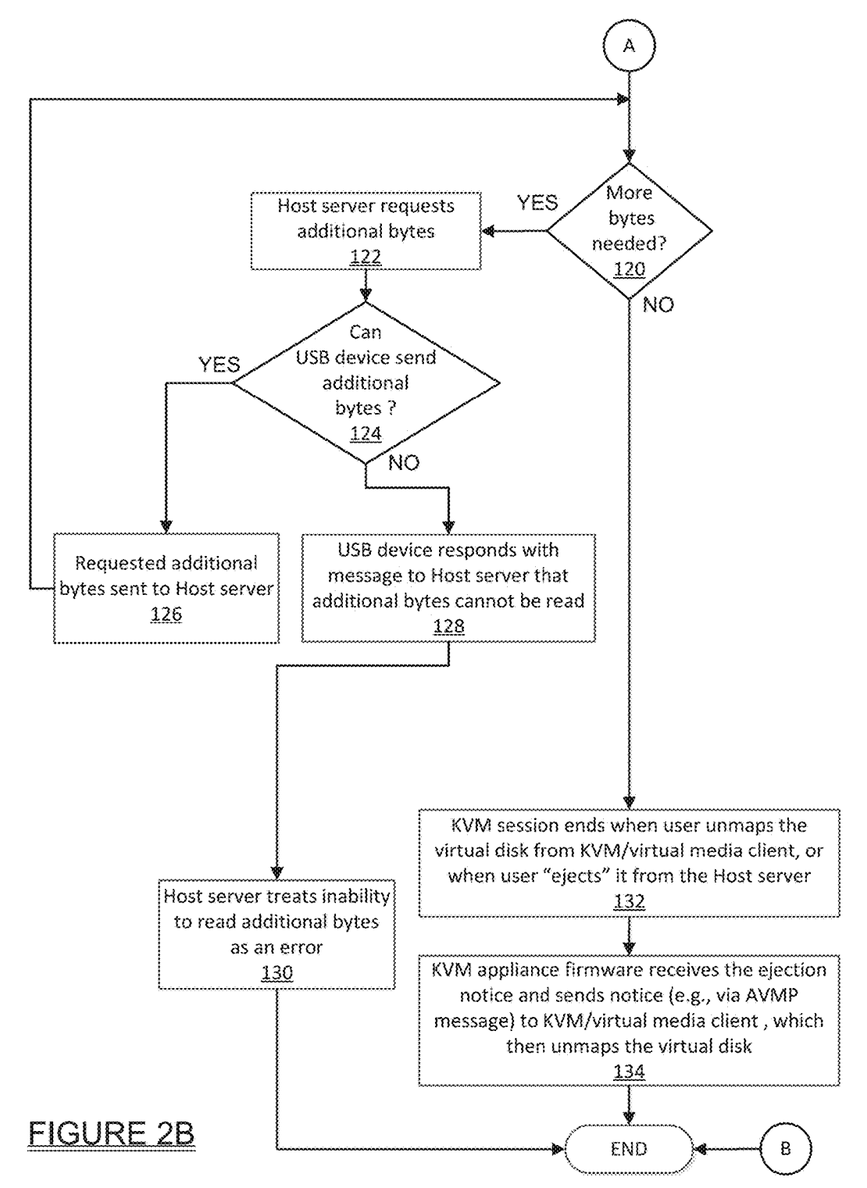

Referring now to FIGS. 2A and 2B, a flowchart 100 illustrating an example of a sequence of operations between the HTML5 KVM/virtual media client 20 and the Host server 16 will be presented. Initially at operation 102 (FIG. 2A) the user establishes a KVM session with the Host server 16 via the HTML5 KVM/virtual media client 20 running in the user's Web browser 14. At operation 104 the KVM appliance 18 sends the HTML5 KVM/virtual media client 20 a list of virtual media devices available for mapping on the Host server 16. At operation 106 the user selects the Host server device to be mapped, and then selects specific content to be mapped via a virtual disk image. The content to be mapped may be a specific file or possibly a directory or subdirectory.

At operation 108 the HTML5 KVM/virtual media client 20 packages the selected content using a selected format (e.g., FAT32 or ISO9660) to create a virtual disk image of the selected content in the browser's sandbox 22. At operation 110 the HTML5 KVM/virtual media client 20 sends a message to the Host server 16 notifying the Host server of the available virtual disk image, and exposes the virtual disk image to the Host server 16 for use. Regarding the message that may be sent, it will be appreciated that any messaging protocol may be employed, but in one preferred form AVMP (Avocent Virtual Message Protocol) messages may be used. The Avocent Virtual Messaging Protocol is a proprietary protocol of Avocent, Inc., a Vertiv company.

At operation 112 the Host server 16 obtains the virtual disk image and then sends a message (e.g., AVMP message) back to the HTML5 KVM/virtual media client 20 with the starting block number and number of blocks of data to retrieve. At operation 114 the HTML5 KVM/virtual media client 20 translates the request into the specific files that make up the virtual disk image and the specific content from those files (i.e., offset into the file and number of bytes to read from the file). It will also be appreciated that creating the virtual disk image involves creating the structural elements of a disk image such as the boot sector and FAT tables. The data of a disk image typically stored in files within the disk image is not part of the virtual disk image. Instead, the present system and method keeps references to the files so that when a request for a certain data block (or set of blocks) is received, a reverse lookup may be performed. The reverse lookup determines which files contain the requested data, and then an operation may be performed to go and retrieve that data from the client workstation. The data is retrieved by copying those portions of the required files into the sandbox 22 and then transmitting the data to the Host server 16. The files which make up the disk image are not brought into the sandbox 22 until their data is needed, and then only those portions of the files that are needed are brought into the sandbox. Accordingly, this methodology forms a type of "on-demand" system.

At operation 116 the HTML5 KVM/virtual media client 20 sends the data represented by the selected bytes to the Host server 16. At operation 118 the Host server 16 receives the transmitted bytes. It will be appreciated that the bytes received by the Host server 16 are from certain blocks on the virtual disk image. However, the Host server 16 does not know that the bytes are from a disk image. To the Host server 16 it appears that it is obtaining the bytes of data from a physical device connected to its USB port 26.

Referring to FIG. 2B, at operation 120 the Host server 16 determines if additional bytes are needed. If so, the Host server 16 requests the additional bytes, as indicated at operation 122. A check is then made if the additional bytes can be sent by the USB device to the HTML5 KVM/virtual media client 20, as indicated at operation 124, and if so, the requested additional bytes are sent to the Host server 16, as indicated at operation 126. If the check at operation 124 indicates that the USB device cannot send any additional bytes, then the USB device responds with a message to the Host server 16 that additional bytes cannot be read, as indicated at operation 128. The Host server 16 treats this condition as an error, as indicated at operation 130.

If the check at operation 120 indicates that no additional bytes are needed, then the user may end the KVM session by unmapping the virtual disk from the HTML5 KVM/virtual media client 20, or alternatively by "ejecting" it from the Host server 16, as indicated at operation 132. By "ejecting" it will be understood that the Host server 16 "sees" the virtual disk image as a physical connection to a physical device, for example a disk drive on the workstation 12. As such, the Host server 16 can disconnect from the virtual disk image, for example by selecting an "Eject" command, just as if it was disconnecting from a physical virtual media device coupled to its USB port 26. At operation 134 the KVM appliance 18 firmware receives the ejection notice and sends a message (e.g., AVMP message) to the HTML5 KVM/virtual media client 20, which then unmaps the virtual disk image.

By using the HTML5 KVM/virtual media client 20 to create virtual disk images, and to expose the virtual disk images to the Host server 16, the inability of the Web browser to directly access the physical disks on the workstation 12 is at least partially overcome. However, the ability of the Host server 16 to boot off of the physical disks on the client workstation is lost because the sandbox 22 will not allow the HTML5 KVM/virtual media client 20 to read the boot section of the physical device. Essentially any data content stored on the disks of the workstation 12 as files, as well as any virtual media device accessible to the workstation 12 through a physical connection with the workstation, is accessible to the Host server 16. Being able to run the HTML5 KVM/virtual media client 20 in the Web browser 14 also significantly adds to the ease of use for the user because of the user's familiarity with using the Web browser.

Referring further to FIG. 1, in another embodiment the CHROME™ Web browser 50 is used in place of the Web browser 14. Like all browsers, the CHROME™ Web browser 50 has both a temporary sandbox 52 and a persistent sandbox 54. However, the CHROME™ Web browser 50 provides the advantage of allowing files to be written directly from memory into the persistent sandbox 54, which is not possible with other Web browsers. The persistent sandbox will use free space from the user's hard drive.

Figure 3A:
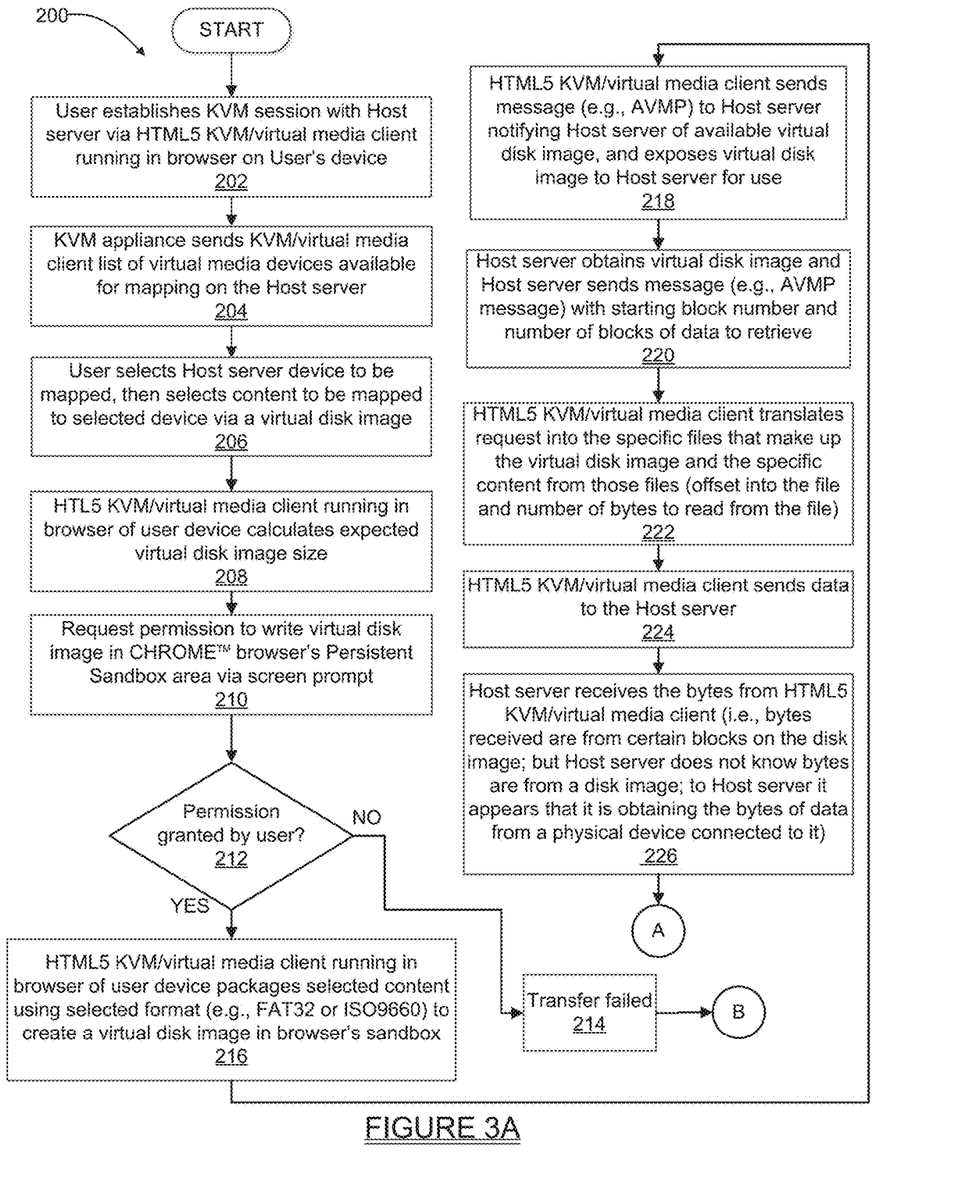
FIG. 3A illustrates a plurality of operations performed by another embodiment of the present disclosure which makes use of a CHROME™ Web browser, and the CHROME™ Web browser's persistent sandbox, when creating the virtual disk image.

Referring to FIG. 3A, a flowchart 200 is shown illustrating various operations that may be performed by the system 10 using the CHROME™ Web browser 50. Operations 202-206 correspond identically to operations 102-106 described in connection with FIG. 2A, and therefore will not be repeated. At operation 208 the HTML5/virtual media client running in the CHROME™ Web browser 50 calculates the expected virtual disk image size. At operation 210, the system 10 requests permission to write the virtual disk image in the CHROME™ Web browser's persistent sandbox 54. This request may be presented via screen prompt on the display of the user's computer display or display terminal. At operation 212 the system 10 checks if permission has been received from the user. If permission was declined by the user, then a message "Transfer Failed" may be presented on the user's computer display or display terminal, as indicated at operation 214. Alternatively, the virtual disk creation process may simply be aborted without generating any message to the user.

If the check at operation 212 indicates that the user has granted permission to write the virtual disk image in the persistent sandbox 54, then at operation 216 the HTML5 KVM/virtual media 20 client running in the CHROME™ Web browser 50 of the user's device packages the selected content using the selected file format (e.g., FAT32 or ISO9660) to create a virtual disk image in the CHROME™ Web browser's persistent sandbox 54. Since the persistent sandbox 54 has much larger storage capacity than the temporary sandbox 52, and since the CHROME™ Web browser 50 can write out files directly to the persistent sandbox 54, this allows for the creation of extremely large virtual disk images in the persistent sandbox. Thus, disk images which may include most, or potentially all, of the files on a user's storage device (e.g., hard disk drive) may be created by the system 10 using the KVM/virtual media client 20 and the CHROME™ Web browser 50.

Figure 3B:
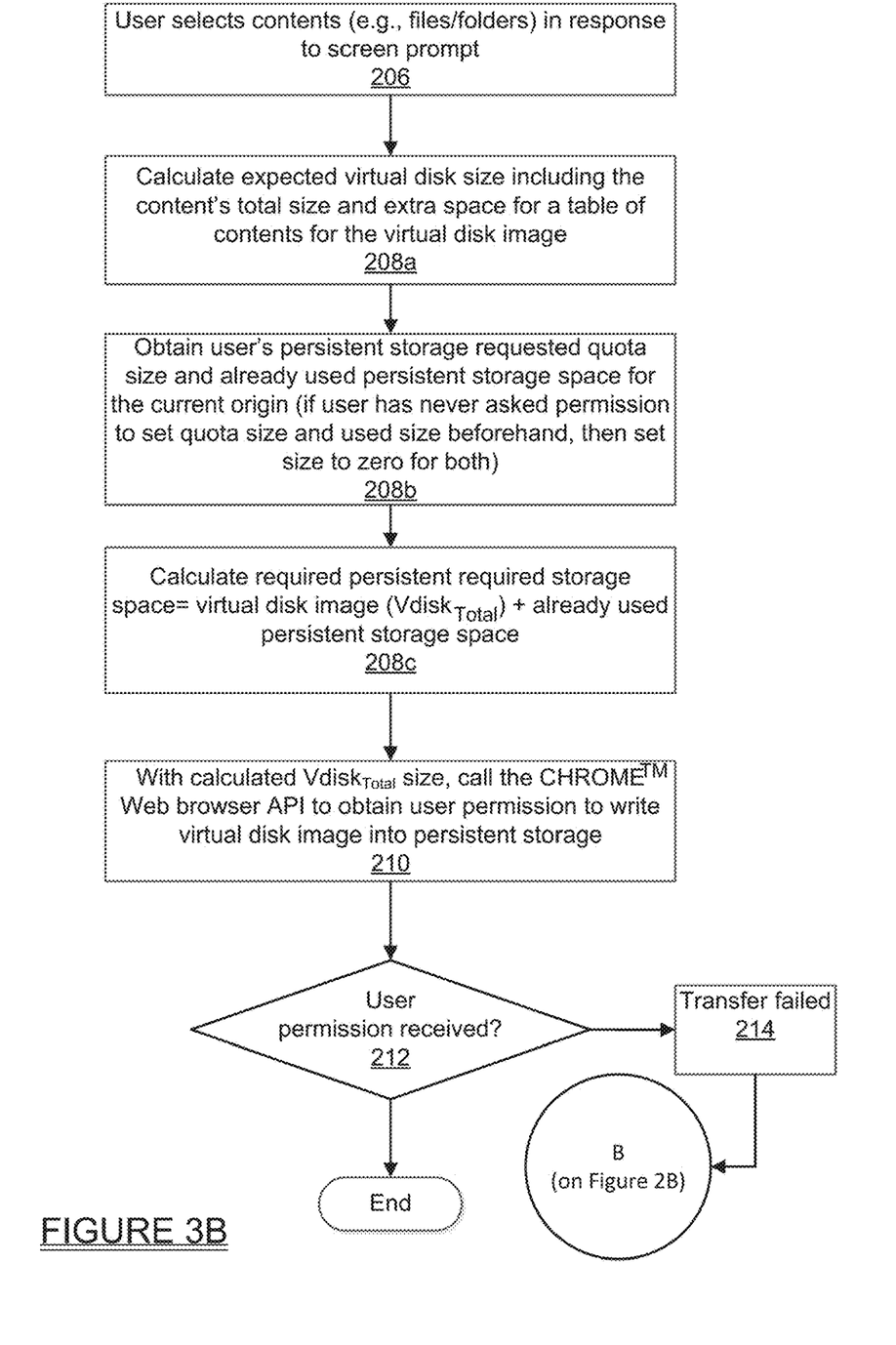
FIG. 3B illustrates in greater detail certain ones of the operations shown in FIG. 3A pertaining to the use of the persistent sandbox in creating the virtual disk image.

With brief reference to FIG. 3B, additional details regarding operations 206-214 are presented. Operation 206 involves the user selecting specific files and/or folders in response to a screen prompt presented by the HTML5 KVM/virtual media client 20 running in the CHROME™ Web browser 50. At operation 208a the HTML5 KVM/virtual media client 20 calculates the expected virtual disk size including the selected content's total size (in bytes), as well as extra space for a table of contents for the virtual disk image to be created. In this regard it will be important to appreciate that determining the size of the file that is to be written into persistent storage, and obtaining permission from the CHROME™ Web browser 50 to write a file of the determined file size into persistent storage, needs to be accomplished, before any attempt is made to write the file into persistent storage.

At operation 208b the HTML5 KVM/virtual media client 20 obtains the user's persistent storage requested quota size and used persistent storage size for the current origin. If the user has never asked permission to set quota size and the user size beforehand, then the size may be set to zero for both of these items. Operation 208b may thus be viewed as encompassing initially specifying the size of the file that will be written into persistent storage, and obtaining permission to write a file of that size into persistent storage. For this operation, the expected virtual disk image size needs to be calculated.

At operation 208c, the HTML5 KVM/virtual media client 20 may then calculate the expected total size (in bytes) of the virtual disk image ($Vdisk_{Total}$). The $Vdisk_{Total}$ will be equal to the size of the selected content plus the size of the table of contents. The persistent storage size being requested will equal the expected virtual disk image size. At operation 210, with the calculated total size determined, the HTML5 KVM/virtual media client 20 calls an API (application programming interface) running in the CHROME™ Web browser 50, which handles communication between the CHROME™ Web browser and remote devices, to obtain user permission to create the virtual disk image. If the CHROME™ Web browser 50 has already granted permission for the expected file size, and if a portion of the persistent storage is already being used, then that portion of persistent storage already being used is added to $Vdisk_{Total}$ and that sum becomes the amount of persistent storage that is being requested. So then the requested persistent storage size becomes $Vdisk_{Total}$+ the already used persistent storage. Therefore, if the CHROME™ Web browser 50 has granted permission at operation 212 to write the file, then operation 216 from FIG. 3A and operations 120-134 from FIG. 2B are performed.

As another example of determining $Vdisk_{Total}$, for example, assume that the calculated virtual disk size is 1 GB, and that no persistent storage has been used yet. Then if sufficient persistent storage space is available, the CHROME™ Web browser API will ask the user for permission to write the virtual disk image into persistent storage. Once the user confirms this request, the CHROME™ Web browser proceeds with writing the virtual disk image (1 GB in this example) into the persistent storage area.

If, for example, 200 MB of persistent storage has already been used when the calculated virtual disk image size is calculated to be 1 GB then the CHROME™ Web browser API will add the 200 MB to the calculated file size of $Vdisk_{Total}$ to form a new sum which represents the total persistent storage space required. So in this example, the CHROME™ Web browser API will determine that it needs 1.2 GB of persistent file storage space, and will then ask the user for confirmation to create the virtual disk image file. If, for example only 1 GB total is available for persistent storage, because 200 MB has already been used, then the CHROME™ Web browser API will determine that it only has 800 MB of persistent storage space available. In this instance, the CHROME™ Web browser API may then provide a screen notification to the user that there is insufficient persistent storage space available for creating the requested virtual disk image file.

The system 10, when using the CHROME™ Web browser 50, thus enables the HTML5 KVM/virtual media client 20 to create virtual disk images which are only limited in size (i.e., in bytes) by the storage capacity of the user's persistent sandbox. This feature may be especially helpful in presenting multiple video files from the user's device to other devices in a single virtual disk image, which would otherwise require the creation of a plurality of individual virtual disk images because of storage limitations caused by use of the temporary sandbox in the user's Web browser.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for creating and exposing virtual disk images to a host server, during a KVM session, using an HTML5 KVM/virtual media client running in a Web browser of a user's device, the Web browser having both a temporary sandbox and a persistent sandbox, the method comprising:
sending a selection to the host server of a specific virtual media device to be mapped on the host server;
using the HTML5 KVM/virtual media client to package selected content using a selected format, and using the persistent sandbox of the Web browser into which the selected content is written, to create a disk image of the selected content in the persistent sandbox of the Web browser;
notifying the host server of an available virtual disk image and exposing the virtual disk image present in the persistent sandbox for use to the host server;
using the host server to obtain the virtual disk image from the persistent sandbox;
using the host server to send a request to the HTML5 KVM/virtual media client for a portion of the data of the virtual disk image to retrieve;
using the HTML5 KVM/virtual media client to translate the request into at least one specific file that makes up the virtual disk image, and to send bytes of data corresponding to the at least one specific file to the host server; and
using the host server to receive the bytes of data corresponding to the at least one specific file.

2. The method of claim 1, further comprising:
using the host server to request additional bytes of data;
making a determination if the additional bytes of data can be presented to a USB device associated with the host server; and
using the HTML5 KVM/virtual media client to send the additional bytes of data to the host server.

3. The method of claim 1, further comprising responding to a command from the user device to unmap the virtual disk image from the HTML5 KVM/virtual media client .

4. The method of claim 1, further comprising responding to a command from the user device to eject the virtual disk image from the host server.

5. The method of claim 1, further comprising sending a status update message from the HTML5 KVM/virtual media client to the host server regarding the number of bytes transferred to the host server.

6. The method of claim 1, further comprising using the HTML5 KVM/virtual media client to package the selected content using at least one of:
an FAT32 format; and
an ISO9660 format.

7. The method of claim 1, wherein creating the virtual disk image further comprises creating structural elements of a virtual disk image including a boot sector and FAT tables.

8. The method of claim 1, further comprising using the HTML5 KVM/virtual media client to maintain references to specific files that correspond to at least one of a specific data block or set of data blocks, and using a reverse lookup operation to determine which specific ones of the files of the disk image correspond to the requested blocks of data.

9. The method of claim 8, further comprising transmitting only those portions of files stored on the user's device that correspond to requested blocks of data into a sandbox of the Web browser of the user's device.

10. The method of claim 1, wherein said using the HTML5 KVM/virtual media client to package selected content using a selected format comprises calculating an expected total virtual disk size ($Vdisk_{Total}$) which includes a total size of the selected content and extra space for a table of contents for the virtual disk image.

11. The method of claim 10, further comprising using the HTML5 KVM/virtual media client to obtain a persistent file storage requested quota size and a user size for a current origin.

12. The method of claim 11, further comprising summing the $Vdisk_{Total}$ size with a used persistent file storage size.

13. The method of claim 12, further comprising using the HTML KVM/virtual media client to call an application programming interface (API) of the user's Web browser and request permission to create the virtual disk image, and when permission is received from the user, then creating the virtual disk image.

14. The method of claim 1, wherein the Web browser comprises a CHROME™ web browser.

15. A system for creating and exposing virtual disk images to a host server, during a KVM session, using an HTML5 KVM/virtual media client running in the Web browser of a user's device, wherein the Web browser has a temporary sandbox and a persistent sandbox each configured for use for storage of data, the system comprising:
 a user device having the Web browser running thereon;
 an HTML5 KVM/virtual media client running in the Web browser, the HTML5 KVM/virtual media client configured to:
  package selected content using a selected format to create a disk image of the selected content in the persistent sandbox of the Web browser;
  notify the host server of an available virtual disk image and exposing the virtual disk image in the persistent sandbox for use to the host server;
  respond to a request from the host server for data corresponding to a portion of the virtual disk image; and
  use the HTML5 KVM/virtual media client to implement a reverse lookup operation to translate the request for data into at least a portion of at least one specific file that makes up the virtual disk image, and to send bytes of data corresponding to the at least a portion of one specific file to the host server for use.

16. The system of claim 15, wherein the lookup operation implemented by the HTML5 KVM/virtual media client comprises using the HTML5 KVM/virtual media client to maintain references to specific files that correspond to at least one of a specific data block or set of data blocks requested by the host server, and using determining which specific ones of the files of the disk image correspond to the requested data.

17. The system of claim 15, wherein the HTML5 KVM/virtual media client is further configured to at least one of:
 unmap the virtual disk image from the HTML5 KVM/virtual media client; and
 eject the virtual disk image from the host server.

18. The system of claim 15, wherein said the HTML5 KVM/virtual media client packages selected content using a selected format comprises calculating an expected total virtual disk size ($Vdisk_{Total}$) which includes a total size of the selected content and extra space for a table of contents for the virtual disk image.

19. The system of claim 15, further comprising configuring the HTML5 KVM/virtual media client to obtain a persistent file storage requested quota size and a user size for a current domain.

20. The system of claim 18, further comprising summing the $Vdisk_{Total}$ size with a used persistent file storage size.

21. The system of claim 20, further comprising configuring the HTML KVM/virtual media client to call an application programming interface (API) of the user's Web browser and request permission to create the virtual disk image, and when permission is received from the user, then creating the virtual disk image.

22. The system of claim 15, wherein the Web browser comprises a CHROME™ Web browser.

* * * * *